Figure 1:
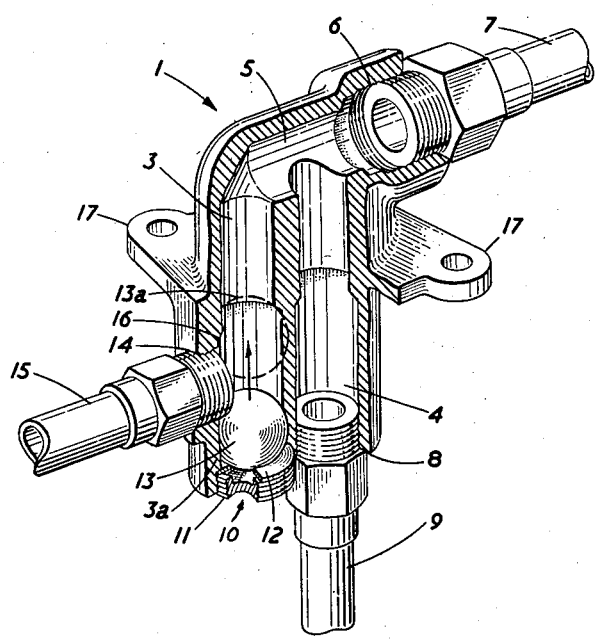

June 9, 1959     W. H. SIMCOCK     2,889,843
VENTING APPARATUS FOR USE WITH AN INVERTIBLE TANK
Filed Sept. 12, 1955

Inventor
WILLIAM HAROLD SIMCOCK
By: Maybee & Legris
       Att'ys

2,889,843

Patented June 9, 1959

2,889,843

VENTING APPARATUS FOR USE WITH AN INVERTIBLE TANK

William Harold Simcock, North York Township, Ontario, Canada, assignor to Orenda Engines Limited, Malton, Ontario, Canada, a corporation Application September 12, 1955, Serial No. 533,781

1 Claim. (Cl. 137—43)

This invention relates to a venting apparatus for a liquid-filled tank and more particularly to a gravity controlled venting apparatus for use with an invertible liquid-filled tank.

In order to ensure an even atmospheric pressure in a liquid-filled tank as it is emptied and refilled, it is conventionally known to provide a vent opening formed by a passage through the top of the tank which allows air to escape while the tank is being filled and allows air to be drawn into the tank when it is being emptied, thus equalizing the pressure in the system at all times. The vent inlet opening is positioned in the top of the tank to prevent the liquid from escaping or the vent from being closed by liquid covering its inlet opening. For tiltable tanks, however, an ordinary vent cannot be positioned on the tank in such a way that it will not be accessible to the liquid in the tank; if the tank is inverted the liquid will either escape through the vent or cover the vent opening so that air cannot escape from the tank.

The present invention overcomes these disadvantages by providing a venting apparatus that is rigidly secured to the tank so as to be simultaneously invertible with it, and including two passages leading from the tank, one passage leading out of the top of the tank and the other passage leading from the bottom of the tank. The two passages may be connected to a common outlet. A ball and seat valve in the housing of the venting apparatus closes the conduit leading from the top of the tank when the venting apparatus is in an inverted position and allows the conduit leading from the bottom of the tank to operate.

Figure 2:
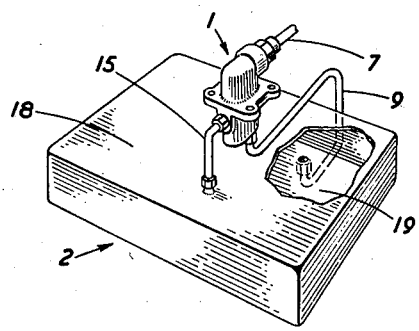

The following is a description of a preferred embodiment of the invention, reference being made to the accompanying drawings in which each reference character indicates the same part in the various views which are as follows:

Figure 1 is a broken-away perspective view of the venting apparatus in upright position; and Figure 2 is a perspective view showing the arrangement of the vent with the liquid-filled tank, together with the interconnecting arrangement of pipes.

The venting apparatus consists of a housing 1 supported rigidly adjacent liquid-filled tank 2. The housing 1, as shown in Figure 1, contains two parallel vertical bores 3 and 4 leading into a common transverse cross-bore 5 which has an opening 6 threaded to receive an outlet pipe or conduit 7. The inlet 8 of bore 4 also is threaded to receive a bottom-inlet pipe 9 that with bore 4 and outlet pipe 7 provides a bottom-inlet venting passage. Bore 3 is threaded at its open end 10 to receive a plug 11.

Adjacent the plug 11, the bore 3 houses a movable ball 13 and a ball rest 12 in the form of an upwardly dished annular disc secured to the wall 3a of the bore 3 so that the ball 13 rests on it when the housing 1 is in a generally upright position. An opening 14 leading transversely into bore 3 through housing 1 is threaded to receive a top-inlet pipe 15. The opening 14 is positioned in the housing 1 so that the pipe 15 enters the bore 3 above the ball 13 when the ball is on the rest 12. Above the opening 14 a valve seat 16 is formed on a tapered shoulder in the wall of bore 3 to receive ball 13 and seal bore 3 when the housing 1 is inverted. Thus the bore 3 with the ball 13 and valve seat 16 constitutes gravity-controlled means for closing the top-inlet venting passage, which includes the top-inlet pipe 15 and the outlet pipe 7.

The housing 1 is connected rigidly to the tank 2 by means of flange 17 which are fixed to the housing. The end of inlet pipe 15 is located near the top 18 of tank 2 while the end of inlet pipe 9 is located near the bottom 19 of the tank.

In the operation of the device the ball 13 sits on the rest 12 when the housing 1 is upright, as shown in Figure 1, allowing air to be vented from the tank 3 through the pipe 15, through the bore 3 and through the cross-bore 5 to the atmosphere. In this upright position no liquid will pass through bore 4.

When the tank 3 and housing 1 are inverted, the ball 13 is moved by gravity onto seat 16, as shown at 13a, which seals bore 3 and thus closes the top-inlet venting passage, which includes pipe 15. In this inverted position pipe 9 in the bottom 19 of tank 3 operates to enable air to pass through the bottom-venting passage.

In both the upright position and the inverted position of tank 3, housing 1 is capable of acting as an inlet venting apparatus rather than as an outlet venting apparatus, but in the same general manner as described above.

The preferred embodiment illustrates the housing 1 located outside the tank 2, but it will be appreciated that the valve could be as effectively placed within the tank. For special purposes it might also be practical to provide passages 3 and 4 with individual outlet conduits instead of the cross-bore 5 and outlet pipe 7.

The device is particularly adaptable to aircraft oil tanks. In such tanks, a lubrication pump draws oil from the tank while a scavenge pump returns oil to the tank. The venting apparatus prevents pressurization in the tank, caused by the excess of scavenge pump capacity over lubrication pump capacity, by venting excess air in the tank to the atmosphere in all positions of the aircraft.

It will be understood that the form of the invention herewith shown and described is a preferred example and various modifications may be carried out without departing from the spirit of the invention or the scope of the appended claim.

What I claim as my invention is:

A venting apparatus connected to an invertible liquid-filled tank comprising a housing connected to the tank, a top-inlet venting passage and a bottom-inlet venting passage leading from top and bottom venting inlets inside the tank respectively near the top and bottom of the tank and opening to the atmosphere beyond the housing, the top-inlet venting passage including a top-inlet pipe and a top-inlet bore in the housing, a ball in the top-inlet bore, the top-inlet pipe leading from the top venting inlet into the top-inlet bore at a port spaced from both ends of the said bore, the top-inlet bore being substantially vertical when the tank is upright or inverted and including a rest for the ball at that end of the top-inlet bore that is below the said port when the tank is upright and a valve seat between the said port and the other end of the top-inlet bore, the other end of the top-inlet bore communicating with the atmosphere so that when the tank is inverted the top-inlet bore is closed by the ball resting on the valve seat, the bottom-inlet passage including a bottom-inlet pipe and a bottom-inlet bore in the housing, the bottom-inlet pipe leading into one end of the bottom-inlet bore, and including a cross-bore in the housing connecting the other end of the bottom-inlet bore with the said other end of the top-inlet bore, the cross-bore having a venting outlet to the atmosphere.

References Cited in the file of this patent

UNITED STATES PATENTS

| | | |
|---|---|---|
| 1,180,482 | Flanders | Apr. 25, 1916 |
| 1,512,597 | Harmon | Oct. 21, 1924 |
| 1,724,878 | Jensen | Aug. 13, 1929 |
| 2,239,098 | Hunter | Apr. 22, 1941 |